United States Patent
Peker et al.

(10) Patent No.: US 10,923,945 B2
(45) Date of Patent: Feb. 16, 2021

(54) MARK AND HOLD SYSTEM AND METHOD

(71) Applicant: Microsemi P.O.E Ltd., Hod Hasharon (IL)

(72) Inventors: Arkadiy Peker, Glen Cove, NY (US); Alon Ferentz, Petach Tikva (IL); Tamir Langer, Tel Aviv (IL)

(73) Assignee: Microsemi P.O.E Ltd., Hod Hasharon (IL)

( * ) Notice: Subject to any disclaimer, the term of this patent is extended or adjusted under 35 U.S.C. 154(b) by 0 days.

(21) Appl. No.: 16/378,350

(22) Filed: Apr. 8, 2019

(65) Prior Publication Data

US 2019/0319483 A1    Oct. 17, 2019

Related U.S. Application Data

(60) Provisional application No. 62/657,969, filed on Apr. 16, 2018.

(51) Int. Cl.
*H02J 9/06* (2006.01)
*H04L 12/10* (2006.01)

(52) U.S. Cl.
CPC ............. *H02J 9/061* (2013.01); *H04L 12/10* (2013.01)

(58) Field of Classification Search
CPC ................................. H04L 12/10; H02J 9/061
USPC ...... 307/64, 18–28; 713/300, 310, 320, 323, 713/324, 330, 340
See application file for complete search history.

(56) References Cited

U.S. PATENT DOCUMENTS

| | | | |
|---|---|---|---|
| 6,986,071 B2 | 1/2006 | Darshan et al. | |
| 9,377,794 B1* | 6/2016 | Dwelley | G05F 1/462 |
| 2003/0146765 A1* | 8/2003 | Darshan | H04L 12/10 |
| | | | 324/539 |
| 2008/0164884 A1* | 7/2008 | Hussain | H04L 12/10 |
| | | | 324/522 |
| 2008/0168283 A1 | 7/2008 | Penning | |
| 2015/0312048 A1 | 10/2015 | Bodo et al. | |

FOREIGN PATENT DOCUMENTS

WO    2017001179 A1    1/2017

OTHER PUBLICATIONS

International Search Report and Written Opinion, PCT/IL2019/050385, dated Jul. 5, 2019.

* cited by examiner

*Primary Examiner* — Tomi Skibinski
(74) *Attorney, Agent, or Firm* — Glass and Associates; Kenneth Glass

(57) ABSTRACT

A mark and hold system comprising a main power supply, a mark voltage power supply and a detection current source. After detection, and optionally classification, the main power supply is disconnected from the PD and instead the PD is connected to the mark voltage power supply. The detection current source draws current through a port resistance of the PSE and the PD. The voltage across the port resistance is monitored to determine whether the PD is still connected to the port.

9 Claims, 3 Drawing Sheets

MARK AND HOLD SYSTEM AND METHOD

TECHNICAL FIELD

The invention relates generally to the field of power over Ethernet (PoE) and particularly to a mark and hold system and method.

BACKGROUND

In PoE systems, the power sourcing equipment (PSE) is arranged to first detect and optionally classify a connected powered device (PD) prior to providing power to the PD. The PSE is further obligated to disconnect the power when it detects that no powered device (PD) is drawing current. PoE further requires certain protection and feedback mechanisms, typically including measurement of the PSE output port voltage. However, in order to reconnect the power when the PD needs to draw current, detection and classification must be performed, which can take up to a second to complete. For applications such as lighting, such a wait is unacceptable. In order to overcome this issue, the PD is arranged to draw a minimal current even when not operating. Such a current is sufficient to maintain the PD electronics, such as the memory, in a standby state but not sufficient for full operation. Thus, as long as the PSE detects that the minimal current is being drawn, it knows that the PD is still connected and no further detection and classification is necessary.

This is typically performed in a maintain power signature (MPS) state, where the PD draws an MPS current and the PSE monitors the drawn current. When the PSE detects that no MPS current is being drawn, it determines that the PD is no longer connected and disconnects the power from the port. In order for the PD to enter such an MPS state, and leave such an MPS state, responsive to a PSE host, it requires communication from the PSE host. Unfortunately, such communication between the PD and the PSE host may not be simply provided, adding to cost.

SUMMARY OF THE INVENTION

Accordingly, it is a principal object of the present invention to overcome at least some of the disadvantages of prior art PoE systems. This is accomplished in one embodiment by a mark and hold system comprising a main power supply, a mark voltage power supply and a detection current source. After detection, and optionally classification, the main power supply is disconnected from the PD and instead the PD is connected to the mark voltage power supply. The detection current source draws current from the main power supply through a port resistance of the PSE and the voltage across the port resistance is monitored to determine whether the PD is still connected to the port.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. The term 'resistor' as used herein is meant to include, without limitation, any suitable element providing electrical resistance. The term 'inductor' as used herein is meant to include, without limitation, any suitable element providing electrical inductance. The term 'capacitor' as used herein is meant to include, without limitation, any suitable element providing electrical capacitance. In the accompanying drawings.

DETAILED DESCRIPTION OF THE PREFERRED EMBODIMENTS

Figure 1A:
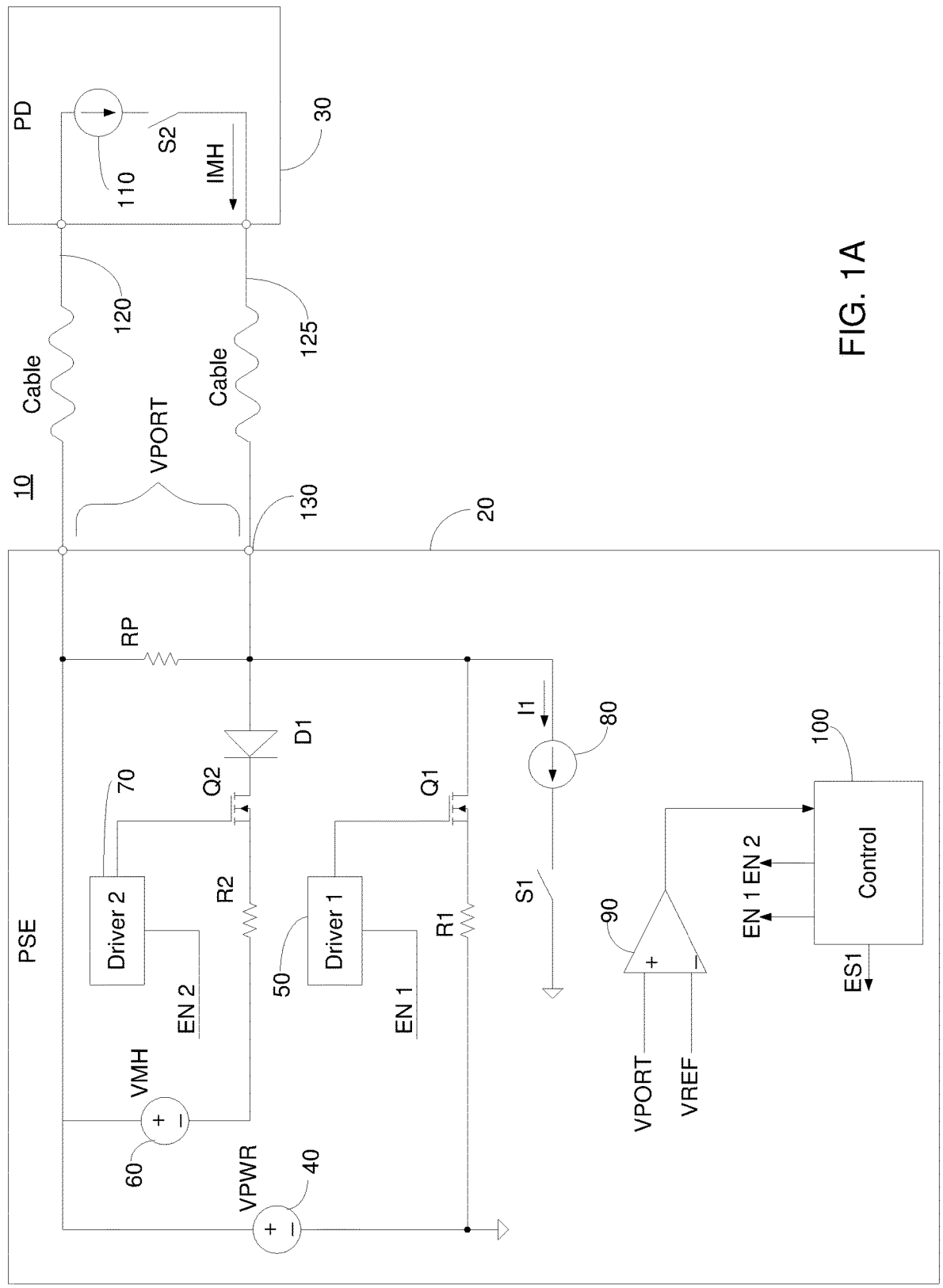
FIG. 1A illustrates a high level block schematic diagram of a PoE system, in accordance with certain embodiments.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1A illustrates a high level schematic diagram of PoE system 10, in accordance with certain embodiments. PoE system 10 comprises: a PSE 20; and a PD 30, with PSE 20 connected to PD 30 via twisted wire pairs of a cable, the twisted wire pairs exhibiting some resistance. PSE 20 comprises: a main power source 40; a sense resistor R1; an adjustable current path Q1; a driving circuitry 50, denoted driver 1; a mark power source 60; a current limiting resistor R2; an electronically controlled switch Q2; a driving circuitry 70, denoted driver 2; a detection current source 80; an electronically controlled switch S1; a port resistor RP; a comparator 90; a diode D1; and a control circuitry 100. The voltage across port resistor RP, i.e. the voltage across output port 130 of PSE 20, is denoted VPORT. PD 30 comprises: a current source 110; and an electronically controlled switch S2. Main power source 40 is arranged to generate a first voltage, denoted VPWR, and mark power source 60 is arranged to generate a second voltage, denoted VMH. Voltage VPWR is greater than voltage VMH. In one embodiment, voltage VPWR is about 57 Volts and voltage VMH is between 7-10 Volts.

In one embodiment, adjustable current path Q1 is implemented as an n-channel metal-oxide-semiconductor field-effect-transistor (NFET), having a closed loop current control (connections to driving circuitry 50 not shown) responsive the voltage drop across sense resistor R1 and is described herein as such. Similarly, in one embodiment electronically controlled switch Q2 is implemented as an NFET, and is described herein as such. In one embodiment, as illustrated, current source 110 is arranged to draw a predetermined current, denoted IMH. In another embodiment (not shown), current source 110 comprises a load resistance, and predetermined current IMH is drawn responsive to voltage VPORT. In one embodiment (not shown), each of driving circuitries 50 and 70 comprises a respective power source, or a respective connection to main power source 40, and an electronically controlled switch arranged to alternately connect and disconnect the respective power source to an output thereof. In a typical embodiment, IMH is in the range of 250 microamperes to 4 milliamperes.

A first side of main power source 40 is coupled to a first side of mark power source 60, a first end of port resistor RP and a first side of current source 110 of PD 30 via a first portion 120 of the cable. A second side of current source 110 is coupled to a first side of electronically controlled switch S2. A second side of electronically controlled switch S2 is coupled, via a second portion 125 of the cable, to a second end of port resistor RP, through diode D1 to the drain of NFET Q2, to the drain of NFET Q1 and to a first side of detection current source 80. The gate of NFET Q2 is coupled to the output of driving circuitry 70 and the source of NFET Q2 is coupled to a first end of current limiting resistor R2. A second end of current limiting resistor R2 is coupled to a second side of mark voltage source 60. The gate of NFET Q1 is coupled to the output of driving circuitry 50 and the source of NFET Q1 is coupled to a first end of sense resistor R1. A second end of sense resistor R1 and a second side of main voltage source 40 are each coupled to a common potential. A second side of detection current source 80 is coupled to a first side of electronically controlled switch S1 and a second side of electronically controlled switch S1 is coupled to the common potential.

A non-inverting input of comparator 90 is arranged to receive the voltage across port resistor RP, denoted VPORT, and an inverting input of comparator 90 is coupled to a reference voltage denoted VREF. In one embodiment (not shown), a feeding circuit is further provided to feed the voltage across port resistor RP to the non-inverting input of comparator 90, as known to those skilled in the art at the time of the invention. As indicated above, measurement of the PSE output port voltage is typically implemented in prior art PSE designs. In one embodiment, VPORT is measured by an A/D converter, and the output is digitally compared to a predetermined value of VREF acting as comparator 90. An output of comparator 90 is coupled to an input of control circuitry 100. A first output of control circuitry 100 is coupled to an input of driving circuitry 50, the signal at the output denoted EN1, and a second output of control circuitry 100 is coupled to an input of driving circuitry 70, the signal at the output denoted EN2. A third output of control circuitry 100 is coupled to a control terminal of electronically controlled switch S1, the signal at the output denoted ES1.

Figure 1B:
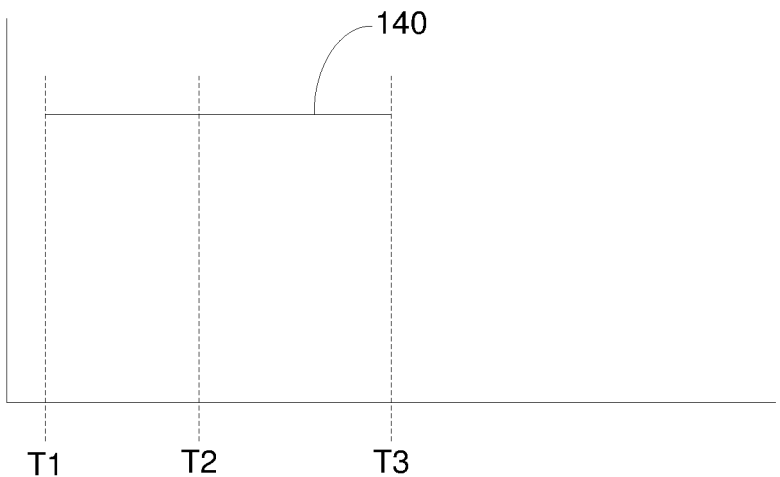
FIGS. 1B-1C illustrate high level graphs of voltage and current levels of the PoE system of FIG. 1A.
Figure 1C:
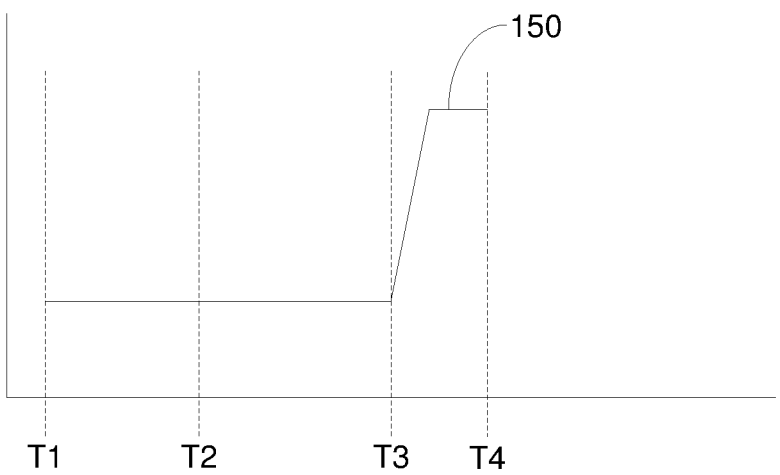

The operation of PoE system 10 will be described in relation to the graphs of FIGS. 1B-1C. Particularly, FIG. 1B illustrates a graph 140 of current IMH drawn by current source 110 of PD 30, wherein the x-axis represents time and the y-axis represents current magnitude in arbitrary units. FIG. 1C illustrates a graph 150 of port voltage VPORT of PSE 20, wherein the x-axis represents time and the y-axis represents voltage in arbitrary units.

In operation, control circuitry 100, typically responsive to a PSE host command, controls a detection circuitry (not shown) to perform a detection stage to determine whether a valid PD 30 is coupled thereto, as known to those skilled in the art at the time of the invention. In one embodiment, detection current source 80 acts as a current sink for the detection circuitry. Optionally, a classification circuitry is further provided (not shown) and is arranged, upon detection of a valid signature resistance, to perform classification of PD 30.

Following detection and classification, control circuitry 100 determines whether PD 30 is to be provided with power. In the event that a PSE host instructs PSE 20 to provide power to PD 30, control circuitry 100 controls signal EN1 to be high, thereby keeping NFET Q1 in a closed position and allowing power from main power source 40 to be supplied to PD 30 at the operating voltage. The current is monitored via the closed loop current control (not shown) responsive to the voltage drop across sense resistor R1.

In the event that following detection and classification an instruction is received from the PSE host at PSE 20 to enter a mark and hold state, after a predetermined time period, at time T1, control circuitry 100 outputs a high signal EN2 and a low signal EN1. As a result, NFET Q1 will be open and NFET Q2 will be closed, thereby providing power to PD 30 from mark power source 60. Output port 130 is "marked" as having a valid PD, which is maintained in a sleep mode, coupled thereto, by setting a memory associated with control circuitry 100, or by setting a state machine to an appropriate state. As described above, voltage VMH generated by mark power source 60 is less than the voltage generated by main power source 40. A control circuitry of PD 30 (not shown) is arranged, responsive to the lower voltage VMH being presented thereto, to put PD 30 into a standby, or sleep, mode, wherein only a minimal amount of power is consumed, i.e. a keep alive, or mark and hold current, sufficient to maintain a memory of the PSE classification information received at PD 30 during the classification stage. This is illustrated in FIG. 1A by current source 110 which is enabled responsive to the closing of electronically controlled switch S2. Current source 110 thus begins drawing the mark and hold current, denoted IMH. In the case of a short circuit being presented to output port 130, current limiting resistor R2 acts a current limiter to prevent the creation of a large current surge. It is to be noted that the prior art current monitoring mechanism utilized to monitor MPS, and maintain control of the port current, are associated with NFET Q1 and sense resistor R1, and are thus not available to monitor the existence, or absence, of the keep alive current IMH. Thus, there is lacking a mechanism provided to identify if PD 30 has been disconnected.

At time T2, control circuitry 100 outputs an active signal ES1, thereby closing electronically controlled switch S1. Current source 80 thus begins to draw a current, denoted I1, from main power source 40. In the event that the magnitude of current I1 is less than, or equal to, the magnitude of current IMH, current I1 will flow through PD 30, as part of current IMH. In the event that the magnitude of current I1 is greater than the magnitude of current IMH, current I1 is divided, a first portion of I1 flowing through PD 30 as current IMH and a second portion of I1 flowing through port resistor RP. In one embodiment, as illustrated in graph 150, the magnitude of current I1 is set to be close to the minimal magnitude of current IMH, which as described above is optionally in the range of 250 microamperes to 4 milliamperes, thus current I1 will have a negligible impact on voltage VPORT. Voltage VPORT is monitored by control circuitry 100 and as long as it doesn't rise significantly, the mark and hold state is maintained. As will be described further below, a significant rise in VPORT is evidence of disconnection of PD 30, thus requiring the shut off of the disconnected port.

At time T3, a control circuitry of PD 30 (not shown) opens electronically controlled switch S2 in response to shut off of PD 30, thereby ceasing current IMH. It is noted, that this is described as happening due to opening of electronically controlled switch S2, however this is meant for descriptive purposes only and is not meant to be limiting. In another embodiment, current IMH ceases due to disconnection of PD 30 from output port 130 of PSE 20. As a result of the disconnection of current source 110 and/or disconnection of PD 30 from PSE port 130, current I1 no longer flows through PD 30 and instead flows through port resistor RP, thereby causing a rise in voltage VPORT. FIG. 1C shows voltage VPORT rising gradually due to various capacitances (not shown) in parallel to port resistor RP. When voltage VPORT rises higher than reference voltage VREF, at time T4, control circuitry 100 outputs a low signal EN2 thereby opening NFET Q2 and further marks the port as disconnected in a memory associated with control circuitry 100 or by setting a state machine of control circuitry 100 to the appropriate state and/or by communication of the disconnect to the PD host. Power is thus no longer provided to port 130. If a PD is again connected to port 130, detection and optionally classification will again be performed responsive to the marking of the port in the memory of control circuitry 100. In one embodiment, voltage VPORT is monitored over a predetermined time period such that only if voltage VPORT rises for the entire period is the port marked as disconnected, allowing for a modulated mark and hold current IMH.

Thus, PSE 20 allows for rapid turn on of lighting since after receiving a command to power up PD 30 from the PD host, responsive to the lack of a mark of the port 130 as disconnected, does not perform detection and classification. Advantageously, PSE 20 is able to detect disconnect of PD 30 from port 130 without having to monitor mark and hold current IMH. Further advantageously, no communication between PSE host and PD 30 is necessary for the above described mark and hold configuration. Additionally, the mark and hold state operates at a low voltage, of optionally 7-10 volts, which reduces the amount of power consumed current IMH. This can become significant since PD 30 may be in a standby mode for days or more. Furthermore, PSE 20 performs these functions utilizing existing circuitry, including detection current source 80 and the measurement circuitry for port voltage VPORT.

Figure 2:
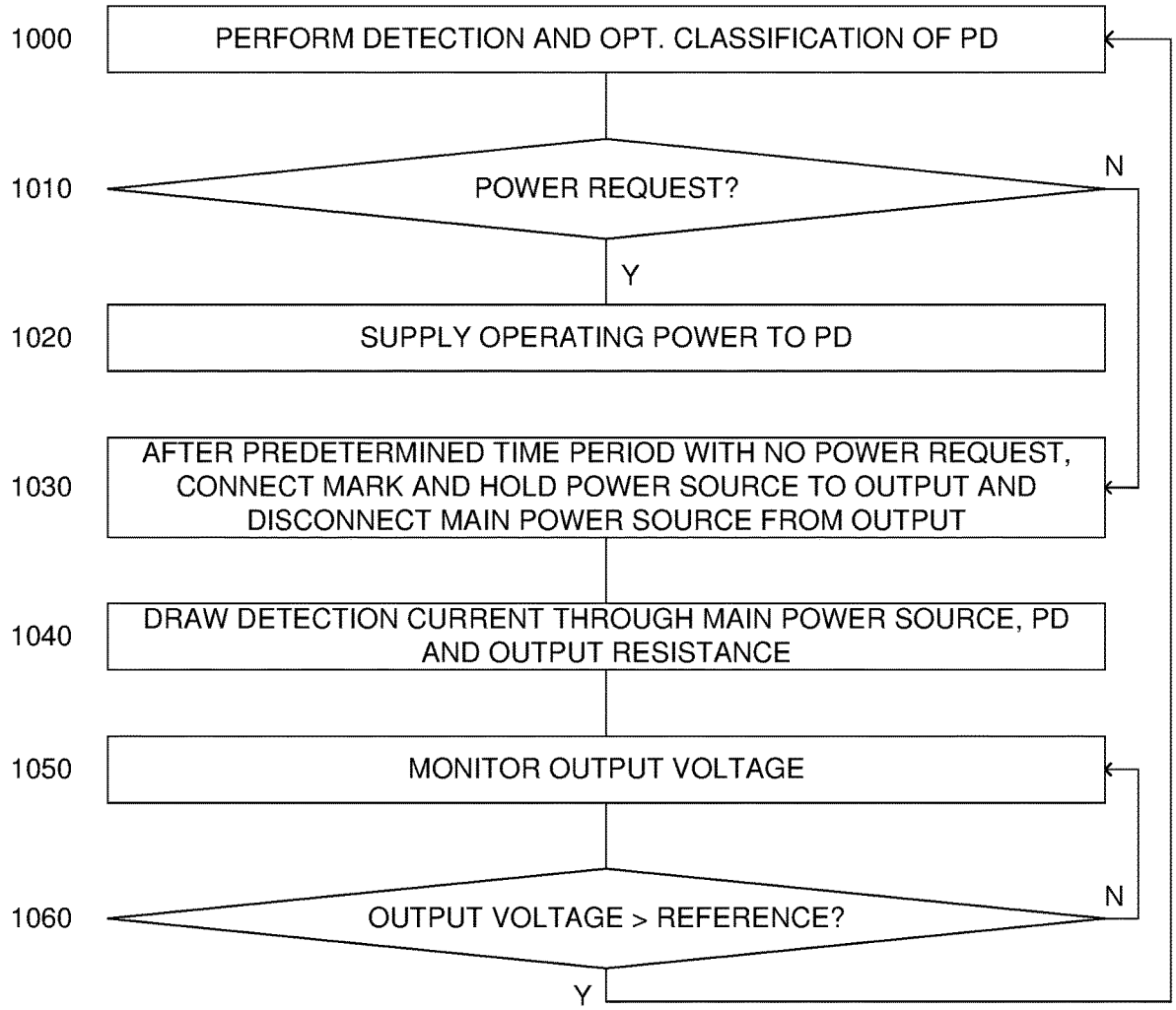
FIG. 2 illustrates a high level flow chart of a mark and hold method, in accordance with certain embodiments.

FIG. 2 illustrates a high level flow chart of a mark and hold method in accordance with certain embodiments. In stage 1000, detection is performed to determine whether a valid PD signature resistance is presented to the output of a PSE, typically utilizing a current source, such as detection current source 80. Optionally, classification is also performed to determine the class of the detected PD. In stage 1010, for a predetermined time period, the PSE waits for a power request for the PD of stage 1000, typically from a connected host. In the event that a request for power is received for the PD, in stage 1020 operating power is supplied by a main power source. In one embodiment, the voltage output by the main power source is 57 Volts.

In the event that a request for power is not received during the predetermined time period, or a mark and hold command is received from the PD host, in stage 1030 a mark and hold power source is connected to the PSE output and the main power source of stage 1020 is disconnected from the output of the PSE. The voltage output by the mark and hold power source is less than the voltage output by the main power source. In one embodiment, the voltage output by the mark and hold power source is between 7-10 Volts. The port is marked as having a valid PD, not requesting power, coupled thereto.

In stage 1040, a predetermined current is drawn, or driven, through the PSE by a current source in the PSE, optionally the current source being at least one detection current source used in stage 1000. In one embodiment the predetermined current is driven through the main power source of stage 1020, the PD of stage 1000 and a resistance across the output of the PSE. As a result, a first portion of the detection current flows through the PD and a second portion of the detection current flows through the output port resistance, such as RP described above. In stage 1050, the voltage across the output resistance, VPORT, is monitored. In stage 1060, in the event that the voltage across the output resistance is less than a reference voltage, i.e. the first portion of the detection current is flowing through the PD and not through the output resistance, stage 1050 is again performed. Responsive to the PD being disconnected, the first portion of the detection current will now flow through the output resistance and the output voltage will rise. In the event that output voltage rises above the predetermined reference voltage, it is determined that the PD of stage 1000 is no longer connected, the port is marked as disconnected in the associated memory, and stage 1000 is again performed.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination. In particular, the invention has been described with an identification of each powered device by a class, however this is not meant to be limiting in any way. In an alternative embodiment, all powered device are treated equally, and thus the identification of class with its associated power requirements is not required.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. A power sourcing equipment comprising:
a main power source switchably coupled to an output port;
a mark power source switchably coupled to the output port, a voltage output by said mark power source less than a voltage output by said main power source;

a port resistance presented across the output port, a first side of said main power source coupled to a first side of said mark power source, a first end of said port resistance and said output port;

a control circuitry; and a current source coupled to said output port, coupled to a second end of said port resistance and arranged to draw current through said port resistance and said output port responsive to said control circuitry, said control circuitry arranged to:
  detect a connected powered device;
  couple said main power source to the output port responsive to detection of the connected powered device;
  couple a second side of said mark power source to the output port and to said second end of said port resistance;
  decouple said main power source from the output port;
  enable said current source; and
  responsive to a voltage across said port resistance being above a predetermined value responsive to said enabled current source, cease power supply to the output port from said mark power source.

2. The power sourcing equipment according to claim 1, wherein said control circuitry performs said detection of the connected powered device responsive to said current source.

3. The power sourcing equipment according to claim 1, wherein said current drawn by said current source further flows through the connected powered device.

4. The power sourcing equipment according to claim 3, wherein said connected powered device is arranged to draw a predetermined current when coupled to said mark power source.

5. The power sourcing equipment according to claim 1, wherein responsive to said voltage across said port resistance being above the predetermined value, said control circuitry is further arranged to mark the port as disconnected.

6. The power sourcing equipment according to claim 1, wherein said voltage across said port resistance is measured by an analog to digital circuit.

7. A method of maintaining power for a powered device from a power sourcing equipment, the method comprising:
  detecting the powered device as connected responsive to a main power source, the main power source coupled to a first end of a port resistance and an output port;
  coupling a first side of a mark power source to the output port and to the first end of the port resistance, coupling a second side of said mark power source to the output port and to a second end of the port resistance, a voltage output by the mark power source less than a voltage output by the main power source;
  decoupling the main power source from the output port;
  drawing, by a current source, a current through the port resistance; and
  responsive to the voltage across the port resistance being above a predetermined value, ceasing power supply to the output port by decoupling the mark power source from the output port.

8. The method according to claim 7, wherein said detecting is performed responsive to said drawn current.

9. The method according to claim 7, further comprising, responsive to the voltage across the port resistance being above the predetermined value, marking the port as disconnected.

* * * * *